(12) United States Patent
Konrath et al.

(10) Patent No.: US 9,719,880 B2
(45) Date of Patent: Aug. 1, 2017

(54) METHOD FOR LEAK TESTING A HOUSING

(71) Applicant: Tesat-Spacecom GmbH & Co. KG, Backnang (DE)

(72) Inventors: Willibald Konrath, Weissach im Tal (DE); Reinhold Schmitt, Aspach (DE); Klaus Scholl, Weinstadt (DE); Haiko Schmelcher, Fichtenberg (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 618 days.

(21) Appl. No.: 14/104,535

(22) Filed: Dec. 12, 2013

(65) Prior Publication Data

US 2014/0165708 A1    Jun. 19, 2014

(30) Foreign Application Priority Data

Dec. 13, 2012    (DE) ........................ 10 2012 024 346

(51) Int. Cl.
  *G01M 3/32*    (2006.01)
  *G01L 9/06*    (2006.01)
  *G01L 19/00*    (2006.01)

(52) U.S. Cl.
  CPC ........... *G01M 3/3272* (2013.01); *G01L 9/065* (2013.01); *G01L 19/0092* (2013.01); *G01M 3/3236* (2013.01)

(58) Field of Classification Search
  CPC ... G01M 3/3272; G01M 3/3236; G01L 9/065; G01L 9/0092
  USPC ........................................................ 73/49.3
  See application file for complete search history.

(56) References Cited

U.S. PATENT DOCUMENTS

| 4,608,866 A * | 9/1986 | Bergquist ............... G01M 3/202 62/55.5 |
| 4,920,785 A * | 5/1990 | Etess ..................... G01M 3/229 73/40.7 |
| 5,214,957 A | 6/1993 | Collins |
| 6,125,692 A * | 10/2000 | Marmonier .......... H01H 33/563 340/605 |
| 8,201,438 B1 * | 6/2012 | Thornberg .......... G01M 3/3263 73/49.2 |
| 8,267,486 B2 * | 9/2012 | Sammoura .......... B81C 99/0045 303/122.05 |
| 8,448,498 B1 * | 5/2013 | Kelley .................. G01M 3/329 73/49.3 |
| 9,097,609 B1 * | 8/2015 | Kelley .................... G01M 3/32 |
| 2004/0112138 A1 * | 6/2004 | Knirck ................. G01L 9/0002 73/754 |
| 2005/0212066 A1 | 9/2005 | Arana et al. |

(Continued)

FOREIGN PATENT DOCUMENTS

DE    41 02 923 A1    8/1992
DE    43 35 838 C1    2/1995
(Continued)

OTHER PUBLICATIONS

European Office Action issued in European counterpart application No. 13 836 226.4-1557 dated Jul. 22, 2016 (Seven (7) pages).

*Primary Examiner* — Daniel S Larkin
(74) *Attorney, Agent, or Firm* — Crowell & Moring LLP

(57) ABSTRACT

A method for testing the tightness of a housing involves providing a pressure sensor in a housing, sealing the housing, and detecting a pressure level in the housing.

12 Claims, 4 Drawing Sheets

(56) References Cited

U.S. PATENT DOCUMENTS

Figure 1:
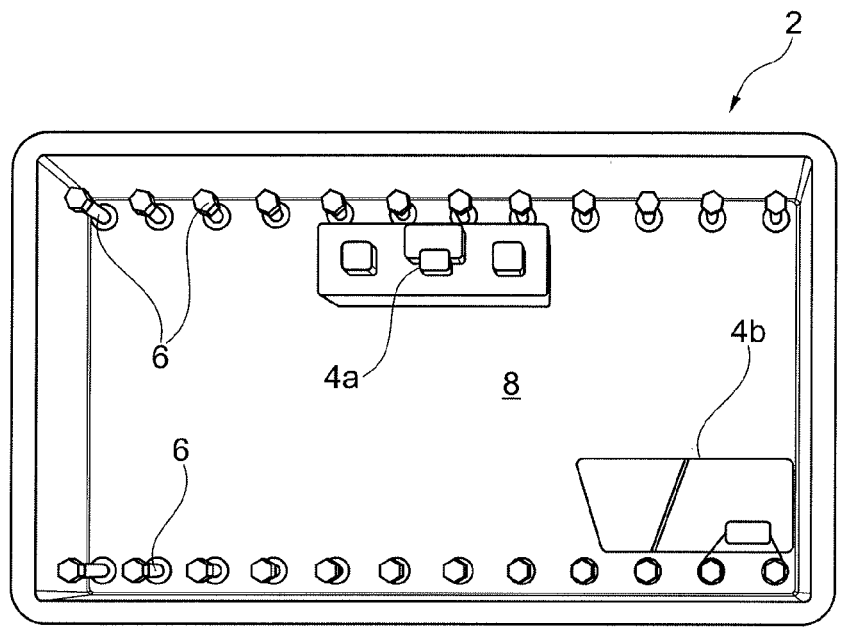

| | | |
|---|---|---|
| 2007/0056638 A1 | 3/2007 | Leimkuehler et al. |
| 2008/0141759 A1 | 6/2008 | Reinert et al. |
| 2010/0064779 A1* | 3/2010 | Gueissaz ............ B81C 99/0045 73/49.3 |
| 2011/0153232 A1* | 6/2011 | Ito ........................ G01M 3/002 702/51 |
| 2012/0085750 A1 | 4/2012 | Hauer |
| 2012/0105236 A1* | 5/2012 | Bach ...................... G08B 21/16 340/605 |
| 2012/0136415 A1* | 5/2012 | Faraji .................... A61N 1/375 607/54 |

FOREIGN PATENT DOCUMENTS

| | | |
|---|---|---|
| DE | 10 2010 056 431 A1 | 6/2012 |
| JP | 2-085739 * | 3/1990 |
| RU | 1772638 * | 10/1992 |
| WO | WO 2012/081537 A1 | 6/2012 |

* cited by examiner

METHOD FOR LEAK TESTING A HOUSING

CROSS-REFERENCE TO RELATED APPLICATIONS

The present application claims priority under 35 U.S.C. §119 to German application number 10 2012 024 346.4, filed Dec. 13, 2012, the entire disclosure of which is herein expressly incorporated by reference.

BACKGROUND AND SUMMARY OF THE INVENTION

The present invention relates to a measurement technique. In particular, the present invention relates to a method for leak testing a housing, in particular a hermetically sealed housing, by means of integrated pressure sensors. Furthermore, the present invention particularly relates to a method for testing the tightness of a housing, a housing component, a platform, in particular a satellite as well as the use of an inventive housing component in an overpressure, underpressure or vacuum application.

In particular application scenarios, such as in an overpressure, underpressure or vacuum application, electronic modules are arranged in a housing that connects outwards the modules, disposed in the housing, by means of appropriate electrical connections. In this case the housing itself is designed in such a way that it is sealed, in particular hermetically sealed, so that the pressure in the housing and a gas composition, provided in said housing, do not appreciably change due to external pressure conditions.

Hermetically sealed housings are tested for leaks during production in order to make sure that moisture cannot penetrate the housing. In particular, the leak testing can be performed as long as products have not yet reached the location, in which they will be used, for example, in a satellite application in orbit, thus in a vacuum. In this case the appropriate test methods may be found in the MIL-STD-883 and MIL-STD-750E standards. For example, helium leak tests or Galden bombing methods can be conducted in order to measure coarse and fine leaks as well as to look for coarse leaks. However, these methods were developed predominantly for testing small components and already exhibit a significant age.

In the aforementioned test methods, the usual procedure is to determine a helium leak rate, from which one can theoretically calculate the actual, specific equivalent air leak rate.

Although it is possible to test highly integrated modules with complex environment electronics outside the hermetically sealed chamber with known leak test methods, this can be performed only under less favorable conditions.

In this respect a hermetically sealed chamber cannot always be physically separated from the rest of a module, i.e. from its environment electronics outside the chamber, for a leak test. Helium, which adheres to or has accumulated in the environment electronics, the mechanical parts, glass fibers, coaxial plugs or cavities, may also preclude a measurement of a helium leak rate or at least may complicate such a measurement. As a result, it is not always possible to draw a guaranteed conclusion about a proper hermeticity.

However, the known test devices that lend themselves well to conducting the aforementioned tests may not be capable of testing larger components or housings, such as those that are used in a satellite application, due to the above-described focus of the test methods on small components.

A housing component can be hermetically sealed by means of a suitable joining process, such as a welding process, in particular laser welding. However, it may not always be possible to observe a delay time between the welding process and a requisite helium leak test, because of the need to wait for the accumulated or adhering helium to volatilize before testing.

However, if the delay time between extraction from the welding chamber and the leak test is too long, all of the helium may have already escaped from the hermetically sealed chamber due to a leak, so that a leak test can no longer be conducted in such a way that it is sufficiently effective.

GALDEN usually cannot be used as a medium for identifying coarse leaks due to a possible contamination of the parts and undesired penetration into parts outside the hermetically sealed chamber. Although an additional test possibility would be an optical inspection to find coarse leaks, such a test represents a relatively unreliable method.

Another possibility of testing pressure vessels is the use of a pressure port as well as the application of a pressure increase or a pressure drop in the housing by means of the pressure port. The pressure increase or pressure drop can also be measured externally by means of the pressure port in so far as a pressure rise or pressure drop occurs following the application of an overpressure or underpressure respectively.

Exemplary embodiments of the present invention are directed to a method for testing the tightness of a housing as well as a corresponding housing component, which implements a novel, simplified leak test, in particular, without any special external measurement efforts.

Specifically, exemplary embodiments of the present invention are directed to a method for testing the tightness of a housing, a housing component, a platform, in particular a satellite, with an inventive housing component as well as the use of an inventive housing component in an overpressure, underpressure or vacuum application.

According to one exemplary embodiment of the present invention, a method for testing the tightness of a housing is provided, wherein said method comprises the steps: i) providing a pressure sensor in a housing, wherein the pressure sensor is configured to detect a pressure level in the housing; ii) sealing the housing; and iii) detecting a pressure level in the housing.

According to an additional exemplary embodiment of the present invention, a housing component is provided, wherein the housing component comprises a housing having an internal volume as well as a pressure sensor, which is configured to detect a pressure level in the internal volume of the housing.

According to another exemplary embodiment of the present invention, a platform, in particular a satellite, with an inventive housing component is provided.

According to an additional exemplary embodiment of the present invention, an inventive housing component is used in an overpressure, underpressure or vacuum application.

One aspect of the present invention involves a hermetically sealed housing for sealing integrated micro-electronics. In this case the housing or more specifically the internal volume of the housing has a pressure sensor that can measure directly and, in particular, at any time the chamber pressure of an enclosed gas, for example nitrogen, helium, or a mixture of nitrogen and helium. The particular pressure ratios or more specifically the pressure ratios or pressure levels as a function of time provide, with regard to the gas temperature, an indication of a leak rate of the housing.

According to an additional exemplary embodiment of the present invention, the detection of the pressure level comprises a detection of an equivalent air leak rate or a change in pressure over time.

A possible sensor element or more specifically a possible pressure sensor is a MEMS (micro-electromechanical system) chip sensor, for example, of the MS 7801 type from the manufacturer MEAS. Such sensor elements lend themselves well to use in hybrid circuits for satellite applications, for example, microwave modules or optoelectronic hybrid modules for satellite communication applications. Furthermore, it must also be pointed out that hermetically sealed hybrid modules can also be used in military and medical applications.

The types of MEMS sensors that can be used include, for example, capacitive MEMS sensors, which change their capacitance by means of an applied pressure, or also piezo-resistive MEMS sensors, which output directly a linear, pressure-dependent voltage, when a constant source current is applied. In this respect the aforementioned sensor of the MS7801 type is a piezo-resistive MEMS chip sensor. Such a sensor can have an internal vacuum reference chamber with a silicon diaphragm and, as a result, enables absolute pressure measurements in a range from 0 to 1 bar or more specifically from a vacuum to normal atmosphere.

Hence, the method according to the invention can directly determine the equivalent air leak rates specified in the aforementioned MIL standards. For a chamber volume of 3 $cm^3$ in size, equivalent air leak rates of $1.0 \cdot 10^{-6}$ atm·$cm^3$/s (mbar·l/s) are specified in compliance with MIL-STD-883, or for a chamber volume of 3 $cm^3$ in size, equivalent air leak rates of $1.0 \cdot 10^{-8}$ atm·$cm^3$/s (mbar·l/s) are specified in compliance with the MIL-STD-750E.

According to another preferred embodiment of the present invention, the detection of the pressure level comprises a detection of a pressure drop when the housing is arranged in an underpressure or vacuum environment and/or a detection of a pressure rise when the housing is arranged in an overpressure environment.

In this case the method according to the invention can detect either a pressure drop ("pressure decay") in an underpressure or vacuum environment or a pressure increase ("pressure rise") in an overpressure environment. At the same time only the hermetically sealed chamber of the housing, thus the internal volume of the housing, is tested. As a result, the method is independent of additional environmental effects. Furthermore, it is possible to dispense with the typical "bombing," i.e. the pumping of detector gas into an overpressure chamber, for typically 15 hours at 3 bar, an approach that is used, for example, in a helium leak test.

According to an additional preferred embodiment of the present invention, the detection of the pressure level may take place in a controlled overpressure environment for a defined unit of time, in particular during a bombing step.

Should it be necessary to bomb with nitrogen, for example, rather than helium due to an unclear leak situation owing to, for example, a prolonged idle period during production, then this bombing period can be used directly as a period for measuring a pressure rise. The net result of this arrangement is a significant reduction in time compared to the time it takes for a helium process.

According to another preferred embodiment of the present invention, a temperature increase in the housing may occur due to the housing being sealed or more specifically upon sealing the housing. This temperature increase induces a first internal pressure level in the housing, so that in the course of a subsequent cooling down process the internal pressure of the housing drops to a second internal pressure level of the housing. In this case the detection of the pressure level may comprise a detection of the pressure drop in the housing from the first internal pressure level in the housing to the second internal pressure level in the housing.

According to an additional preferred embodiment of the present invention, the detection of the pressure drop in the housing from the first internal pressure level in the housing to the second internal pressure level in the housing allows a working temperature to be determined in the course of sealing the housing and/or allows the tightness of the sealed housing to be determined.

When a housing according to the invention is sealed, for example, by a welding or soldering process, the temperature of the enclosed gas (for example, nitrogen) can rise significantly to some extent due to the laser energy. Upon completion of the sealing process, the heated gas cools down again. The net result is a pressure drop in the housing or more specifically in the internal volume of the housing owing to the temperature coefficient or rather the universal gas constant of the enclosed gas, where $TC=3.663 \cdot 10^{-3}/K$.

If the gas was heated, for example, to 80° C. at 1,020 mbar pressure, for example, due to the generated sealing energy, for example, the laser energy, while sealing in a welding unit, then the net result is, for example, a pressure drop from 1,020 mbar to 780 mbar after cooling to 20° C. This mechanism also permits conclusions to be drawn about the temperature in the object during the joining process, for example, during the laser welding process, in particular, if it is assumed that the module is not tightly sealed. In other words, it may be possible to determine a working temperature by means of the resulting pressure level in the chamber after a cooling down process. A coarse leak may be found essentially at once, if there is absolutely no decrease in the pressure at all.

Furthermore, a pressure drop to, for example, 800 mbar after the joining process immediately produces a pressure differential with respect to the atmospheric pressure or more specifically the outside pressure of the housing. This pressure differential enables a subsequent leak test pressure measurement without any additional overpressure or underpressure equipment. As a result, coarse leaks ranging from $10^{-3}$ to $10^{-4}$ mbar·l/s can be detected in less than one minute.

According to another preferred embodiment of the present invention, the sealing of the housing is performed by welding or soldering, in particular, by laser welding, roller seam welding or laser soldering.

According to an additional preferred embodiment of the present invention, the detected pressure level can be passed on to additional electronics in the housing and/or outside the housing.

As a result, the pressure information can be processed directly in the housing by appropriate electronics, in order to initiate suitable measures, for example, upon detection of a non-sealed state. Analogous measures can be performed by electronics outside the housing. In this case the detection in the housing enables an autonomous electronic module in a housing component.

According to another preferred embodiment of the present invention, a leak rate of the housing can be determined directly with the use of a defined value of the internal volume of the housing and a change in pressure over time.

According to an additional preferred embodiment of the present invention, the sensor element may be calibrated using a two point measurement procedure.

The sensor element may be precisely calibrated, for example, for each module separately by means of a two point pressure measurement procedure, based on the atmospheric pressure and a vacuum, using a calibrated measurement device. The calibration may be performed as a fully automated procedure, as a result of which an air leak rate can be calculated directly by means of the pressure drop and a given housing volume, which may vary from housing to housing.

According to another preferred embodiment of the present invention, the pressure sensor may be configured so as to be temperature-compensated.

In order to increase the measurement sensitivity, the pressure sensor may be temperature-compensated. This compensation can take place for a target temperature during normal operation, where the temperature compensation occurs, for example, due to the internal heat of the object as a result of its heat loss. A corresponding compensation may be necessary according to a MIL standard.

According to an additional preferred embodiment of the present invention, when calculating the pressure, the pressure coefficient or more specifically the universal gas constant of an enclosed gas, for example nitrogen or a mixture of nitrogen and helium, may be compensated by computation with the factor $3.663 \cdot 10^{-3}$/K.

Preferably the temperature dependence of the measured gas pressure is determined by computation with the aid of suitable software.

A suitable calibration or more specifically a suitable temperature compensation allows the pressure measurement to be largely temperature independent. This holds true especially in the case that a leak test measurement is carried out exclusively inside a comparatively small temperature window of ±3° C., for example.

Based on the aforesaid, the measurement method according to the invention is largely independent of filler gas, because the dynamic viscosity values (said viscosity values being responsible for the presence of a leak) of the gases that are preferably used are essentially the same or at least quite similar. In this case helium has a viscosity value of $\eta=1.86 \cdot 10^{-5}$ Pa·s; nitrogen, $\eta=1.66 \cdot 10^{-5}$ Pa·s; and air has a viscosity value of $\eta=1.71 \cdot 10^{-5}$ Pa·s. Therefore, if the internal volume of a housing component according to the invention is provided with different gas fillers, the gas fillers produce only negligible differences in the determined leak rates.

According to another preferred embodiment of the present invention, the detection of the pressure level in the internal volume of the housing can be carried out essentially during the entire service life or more specifically the entire life span of a housing component.

In particular, the provision of a pressure sensor in the housing allows a decrease in pressure to be measured at any point during the operating period of a housing module according to the invention. This arrangement enables an in-orbit monitoring of the hermeticity of a module over its whole life span.

BRIEF DESCRIPTION OF THE DRAWING FIGURES

Figure 2:
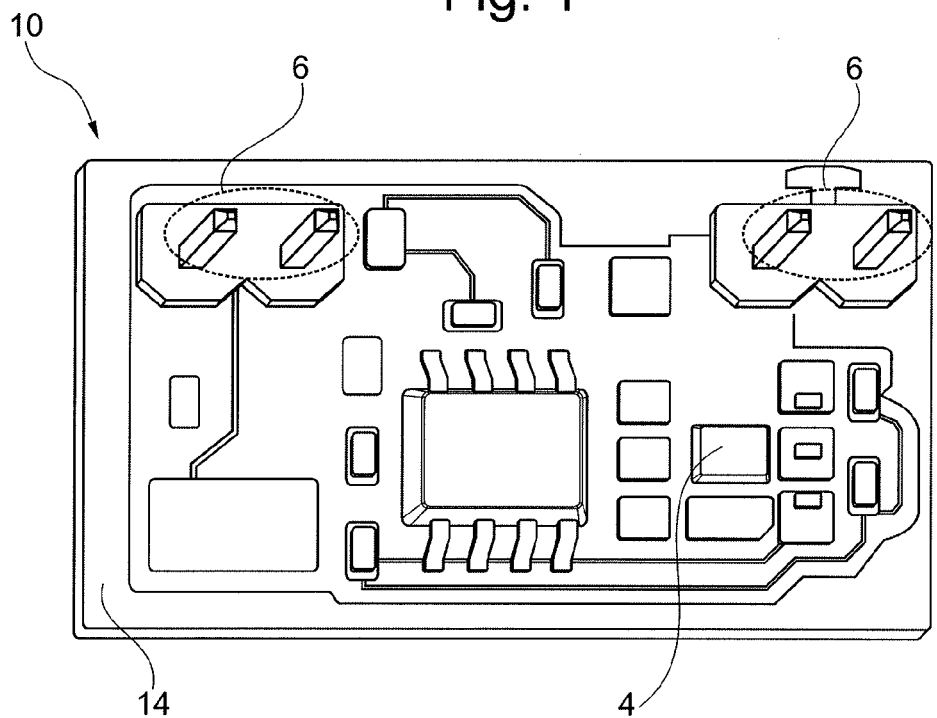
Figure 3:
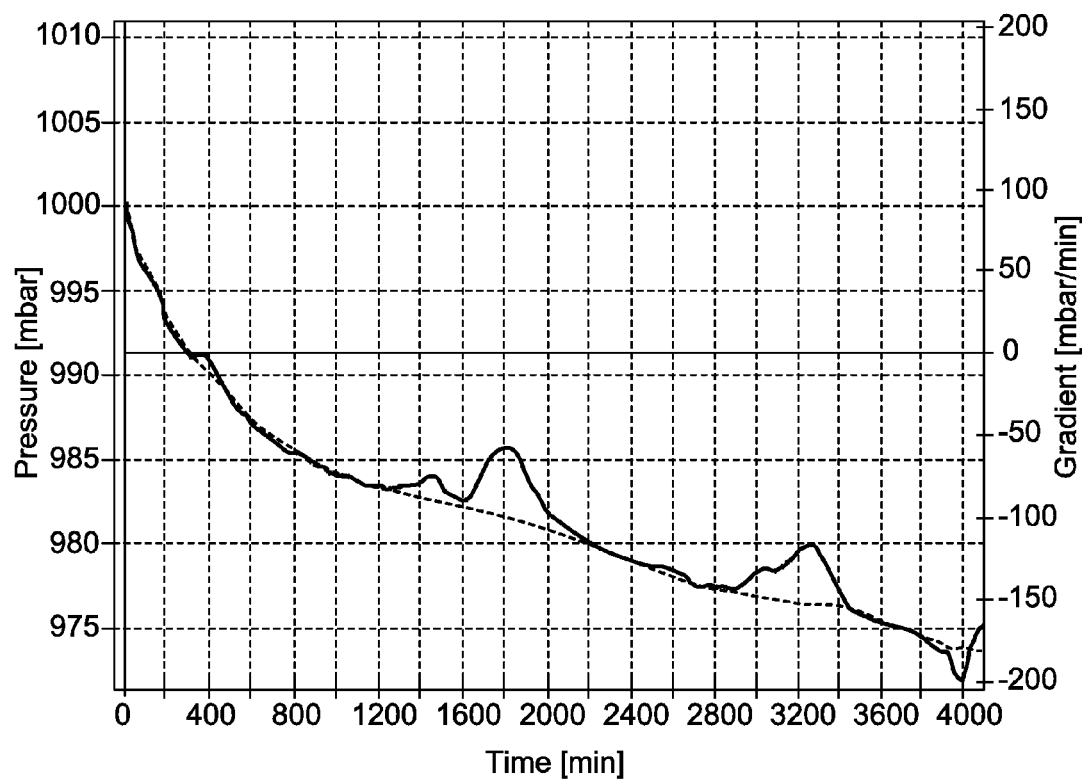
Figure 4:
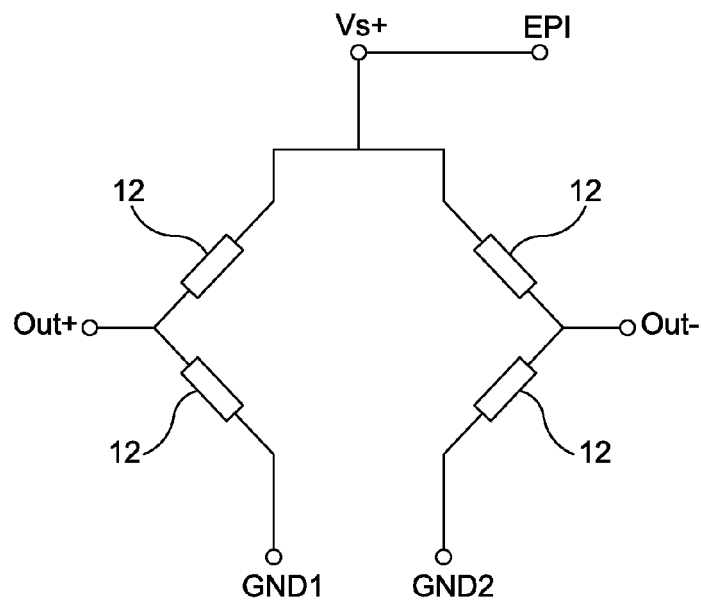
Figure 5:
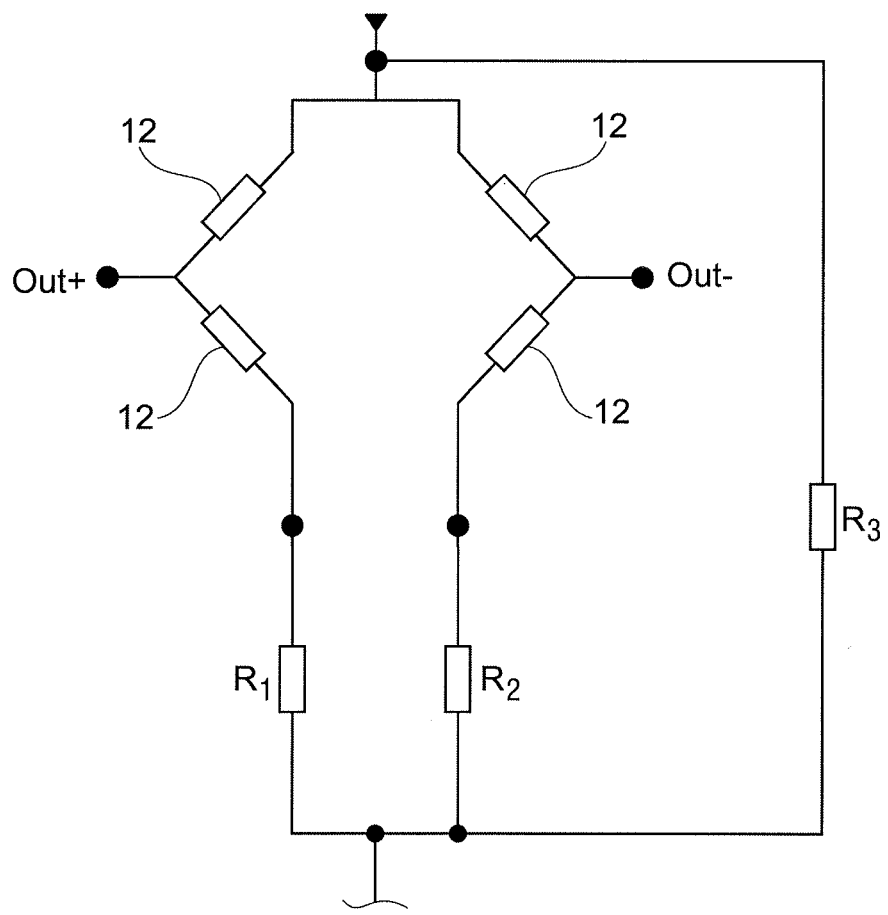
Figure 6:
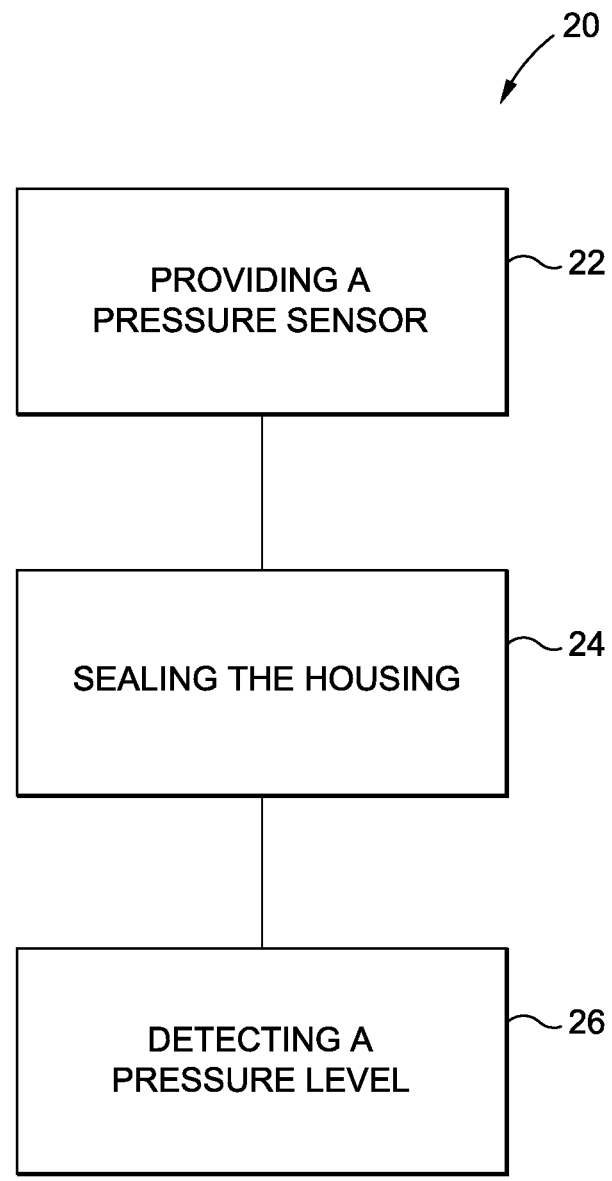

Some exemplary embodiments of the invention are discussed in detail below with reference to the accompanying drawings, which show in FIG. 1 an exemplary embodiment of the arrangement of sensor elements in a housing component according to the present invention;

FIG. 2 an exemplary embodiment of an electronic circuit with a sensor element for installation in a housing component according to the present invention;

FIG. 3 an exemplary measurement of a leak rate at a hermetically sealed module with and without temperature compensation of the present invention;

FIG. 4 an exemplary design of a sensor element according to the present invention;

FIG. 5 an exemplary embodiment of an offset and a temperature compensation of the sensor element from FIG. 4; and FIG. 6 an exemplary embodiment of a method for testing the tightness of a housing according to the present invention.

DETAILED DESCRIPTION

Reference is now made to FIG. 1, where an exemplary embodiment of the arrangement of sensor elements in a housing component according to the present invention is shown.

FIG. 1 shows a housing component 2 or more specifically a portion of a housing component or rather its underside. A plurality of contact elements 6 are provided, which leave the housing component on one side of the housing component 2. In this case the contact elements 6 represent a conductive connection from the interior or rather from the internal volume 8 of the housing component 2 to the external environment. Hence, the contact elements 6 can provide a mechanical attachment and/or an electrical contacting of the housing component 2 with additional electronic components that are located externally.

In FIG. 1 two sensor elements 4 are provided, as examples, in the internal volume 8 of the housing component 2. However, in a deployment scenario only one single sensor element 4 may be provided. In this case the sensor element 4a can be a MEMS chip sensor element, which is bonded in the housing component, while the sensor element 4b may be a capacitive MEMS chip sensor.

Additional electronic components, which may be arranged in the housing component 2 during normal operation, are not shown in more detail in FIG. 1. However, these additional components may also lend themselves to being connected to the outside of the housing component 2 using the contact elements 6.

Next, reference is made to FIG. 2, which shows an exemplary embodiment of an electronic circuit with a sensor element for installation in a housing component according to the present invention.

FIG. 2 shows an exemplary embodiment of a radiometric instrument amplifier. However, the exact configuration or rather the exact field of application of the circuit is not relevant for the inventive concept.

A sensor element 4 is provided, as an example, on a printed circuit board 14 of the circuit 10. Similarly the printed circuit board 14 has contact elements 6, which can penetrate in an appropriate manner the housing wall of the housing component 2 or can be properly attached to the contact elements 6 of FIG. 1. Hence, FIG. 2 shows the integration of a sensor element 4 in a circuit. The needed attachments, such as a power supply or more specifically a voltage supply and measurement outputs for the sensor element 4 may be provided directly on the printed circuit board 14. As a result, the sensor element 4 can be functionally and logically integrated into the circuit 10. Moreover, the circuit behavior of the circuit 10 can also be influenced as a function of a measured value of the sensor element 4.

Next, reference is made to FIG. 3, which shows an exemplary measurement of a leak rate at a hermetically sealed module with and without temperature compensation of the present invention.

The measurement shows a decrease in pressure in the internal volume of a hermetically sealed module or rather a housing component 2. For example, FIG. 3 illustrates a decrease in pressure from the atmospheric ambient pressure 1,000 mbar to a residual pressure of about 975 mbar in the course of 4,000 minutes. The solid line is not temperature compensated, a feature that is depicted by means of the elevations in the curve at 1,500, 1,800 and 3,250 minutes. The dashed line is a temperature-compensated measurement curve. At the same time the comparatively steep drop in pressure to the left side of the curve can also be attributed at least partially to a cooling down process of the housing.

Next, reference is made to FIG. 4, which shows an exemplary design of a sensor element according to the present invention.

FIG. 4 shows an exemplary embodiment of the inventive sensor element 4, constructed as a Wheatstone bridge comprising piezo-sensitive resistors 12 on a silicon diaphragm. The Wheatstone bridge has an input for a supply voltage $V_{S+}$, which is connected by way of example directly to the epitaxial layer of the diaphragm of a sealed vacuum reference cavity. Furthermore, piezo-sensitive resistors 12, which are through-connected from the supply voltage $V_{S+}$ to ground (GND1 or GND2), are provided. Two resistors 12 are connected in each instance to the positive output Out+ as well as to the negative output Out-.

Next, reference is made to FIG. 5, which shows an exemplary embodiment of an offset and a temperature compensation of the sensor element from FIG. 4.

In this case three resistors R1, R2, and R3 are added to the Wheatstone bridge comprising the piezo-sensitive resistors 12 from FIG. 4, in order to enable, on the one hand, an offset compensation (zero point in the vacuum) by using the resistors R1 and R2 and to enable, on the other hand, a temperature compensation by using the resistor R3.

In this respect the requisite elements for the temperature compensation and the offset compensation can be designed, for example as printed resistors in low temperature co-fired ceramic (LTCC) multilayer technology. These resistors can be adjusted, as required, by means of laser trimming. At the same time a simple resistor R3 parallel to the entire bridge may be sufficient for a temperature compensation. This approach allows the temperature coefficient of the bridge resistor of the Wheatstone bridge, where the temperature compensation is typically in a range of 2,800 ppm/° C., to be reduced to 1,900 ppm/° C. In a specific application such a value may compensate more or less completely a temperature coefficient of the maximum output voltage, which occurs at, for example, 1 bar, with −1,900 ppm/° C. Hence, for a limited temperature window of, for example, ±3° C. for the leak test measurement, the net result is a more or less complete compensation.

An offset voltage of a sensor element 4 due to the tolerances in the Wheatstone bridge on the chip of the sensor element 4 may also be trimmed to zero by means of laserable, printed resistors R1, R2 in LTCC multilayer technology.

In particular, two resistors may be used for this purpose. These resistors are arranged between the terminals GND1 and GND2 in such a way that they are connected in series. The center of both resistors is connected to ground. A laser trimming of at least one of the two resistors R1, R2 may balance the tolerances in the Wheatstone bridge by means of a suitable laser compensation algorithm.

The LTCC multilayer technology provides through its hermeticity from one substrate layer to the next a preferred connectivity for wiring a sensor element from the inner, hermetic chamber or rather from the internal volume 8 of the housing component 2 to the external environment. As a result, no separate connectors for a sensor element 4 have to be provided, but rather conventional, hermetically sealed housings can be used.

Next, reference is made to FIG. 6, which shows an exemplary embodiment of a method for testing the tightness of a housing according to the present invention.

In this case the method 20 for testing the tightness of a housing 2 comprises the following steps: providing 22 a pressure sensor 4 in a housing 2, wherein the pressure sensor 4 is configured to detect a pressure level in the housing 2; sealing 24 the housing 2; and detecting 26 a pressure level in the housing 2.

The present invention can also be used advantageously for multiple chamber designs. In such multiple chamber designs a plurality of hermetically sealed housing chambers that are separated from each other are provided in the same hybrid module. In this case the conventional helium measurement technique fails completely.

The present invention can also be used to switch off high frequency amplifiers or other sensitive electronic components, which are used in the satellite electronics, for example: for in-orbit pressure monitoring with respect to the so-called "multiplication" effect. In this case it involves electron avalanches, triggered by high frequency fields, due to the emission of secondary electrons; and these electron avalanches can cause corona effects or arcing. This happens, in particular, when pressure levels are close to a vacuum (the so-called intermediate pressure range) and can destroy elements of the high frequency power amplifier or its surrounding area. If a high frequency power amplifier is installed in a hermetically sealed housing of the invention, for example, a solid state power amplifier in chip and wire technology, and this solid state power amplifier were to lose its gas pressure (sealing pressure) over its service life, then a situation of "multiplication" could arise. By switching off the devices on the basis of the measurement technique according to the invention, secondary damage to the satellite electronics could be prevented.

Hence, the present invention could be used to "switch on and off," as a function of the pressure, the measurement devices or components in orbit or during the start phase (intermediate pressure range, protection against "multiplication").

Finally it must be pointed out that the terms "having" or "comprising" do not exclude other elements or steps and that the terms "a" or "one" do not exclude a plurality. Furthermore, it must be pointed out that the features or the steps that have been described with reference to one of the above exemplary embodiments may also be used in combination with other features or steps of other exemplary embodiments that have been described above. The reference numerals in the claims are not to be regarded in a restrictive sense.

What is claimed is:

1. A method for testing a tightness of a housing, the method comprising the steps:
   providing a sensor element in the housing, wherein the sensor element is configured to detect a pressure level in the housing;
   sealing the housing;

positioning the housing within an overpressure or vacuum chamber and setting a predetermined pressure in the overpressure or vacuum chamber;

detecting, by the sensor element, a change in pressure level in the housing over a period of time;

detecting, by the sensor element, a change in temperature in the housing over the period of time; and determining the tightness of the sealed housing based on said detected change in pressure level taking into account the change in temperature.

2. The method of claim 1, wherein detecting the change in pressure level comprises detecting an equivalent air leak.

3. The method of claim 1, wherein detecting the change in pressure level comprises:

detecting a drop in pressure when the housing is arranged in an underpressure or vacuum environment; or detecting an increase in pressure when the housing is arranged in an overpressure environment.

4. The method of claim 1, wherein when a temperature increase in the housing occurs when the housing is sealed, the temperature increase induces a first internal pressure level in the housing, and during a subsequent cooling down process an internal pressure of the housing drops to a second internal pressure level of the housing, wherein said detecting the change in pressure level comprises detecting a pressure drop in the housing from the first internal pressure level in the housing to the second internal pressure level in the housing.

5. The method of claim 4, wherein the detection of the pressure drop in the housing from the first internal pressure level in the housing to the second internal pressure level in the housing is used to determine a working temperature during said sealing of the housing.

6. The method of claim 4, wherein the detection of the pressure drop in the housing from the first internal pressure level in the housing to the second internal pressure level in the housing is used to determine said tightness of the sealed housing.

7. The method of claim 1, wherein the sealing of the housing is performed by laser welding, roller seam welding, or laser soldering.

8. The method of claim 1, wherein detecting the change in pressure level takes place in a controlled overpressure environment for a defined unit of time during a bombing process.

9. The method of claim 1, wherein the sensor element is calibrated using a two point measurement procedure.

10. The method of claim 1, wherein a leak rate of the housing is determined directly using a defined value of the internal volume of the housing and a change in pressure over time.

11. The method of claim 1, wherein the sensor element is temperature-compensated.

12. The method of claim 1, wherein the detection of the pressure level in the internal volume of the housing is carried out during an entire service life of the housing component.

* * * * *